June 19, 1956     J. R. WILHELM     2,751,084
FUEL TANK FILTER INSTALLATION

Filed March 11, 1954     2 Sheets-Sheet 2

INVENTOR
John R. Wilhelm
BY
Kenyon & Kenyon
ATTORNEYS

United States Patent Office 2,751,084
Patented June 19, 1956

2,751,084

FUEL TANK FILTER INSTALLATION

John R. Wilhelm, Perth Amboy, N. J., assignor to Purolator Products, Inc., Rahway, N. J., a corporation of Delaware Application March 11, 1954, Serial No. 415,470

6 Claims. (Cl. 210—150)

This invention relates to fuel tank filter installations which prevent contaminants in the fuel from being introduced into the storage space of fuel tanks.

The unavoidable introduction of contaminants during the filling of vehicle fuel tanks often results in difficult problems incidental to fuel failure at critical times because the contaminants so introduced will pass from the storage space of the tank into the fuel distributing system and cause clogging. While in the past filters frequently have been installed in the fuel system directly before the carburetor or the fuel injector, the presence of contaminants introduced into the storage space of the fuel tank during filling may clog the fuel system and its feed lines well ahead of the locations of the carburetor or the injector. Such clogging may either be complete with consequent complete fuel feed failure or it may be sufficient to diminish the rate of fuel flow in the feed system sufficiently to impair engine operating efficiency. It is advantageous, therefore, to provide for the installation of a filter unit at the filling entrance to the tank so that the contaminants introduced during tank filling operations will be trapped and eliminated as early as possible and before they are able even to reach the tank storage space. Such advance trapping eliminates these contaminants as a clogging hazard anywhere in the fuel system associated with the tank.

In the practice of this invention the filter installation is positioned within the tank itself and is associated with the tank filler pipe in such a way that the fuel introduced into the filler pipe must pass directly from the filler pipe through the filter element of the installation before it is able to reach the fuel storage space in the fuel tank. In other words, the filter element itself is of the so-called full flow type in that it requires all the fuel to pass through it before such fuel can enter the storage space in the tank. Since this filter element traps the contaminants, it in time becomes dirty and must be removed and replaced. Provision is made for ready replacement of said element.

In practicing the invention, the filter installation comprises a tank, a filler pipe having an outlet end within the tank, a filter housing surrounding the pipe and its outlet end within the tank, a stud supported at the outlet end of said pipe, a supporting member carried by the stud and a filter element carried by the supporting member. The filter element is so located within the filter housing with respect to the outlet end of the pipe within the tank that any fuel delivered to the filler pipe for storage in the tank must pass entirely through the filter element before its actual storage can occur in the tank.

Objects and features of the invention are the provision of an arrangement that will permit the installation of a filtering element with respect to the filler pipe of a fuel tank which will serve to remove contaminants or impurities from the fuel delivered to the tank as the fuel passes from the filler pipe into the tank and before actual storage of the fuel occurs so that the contaminants will not reach the storage space of the tank.

Further objects and features of the invention are the provision of a fuel tank filter installation in conjunction with the tank wherein the filter element itself is easily accessible for inspection, and replacement when necessary.

Other objects and features of the invention are the provision of simple structure useful for the intended purposes which may be manufactured simply and economically and also adapted for use with tank structures presently extant if desired.

Other objects and features of the invention will become apparent from the following specification and the accompanying drawings wherein.

Figure 1:
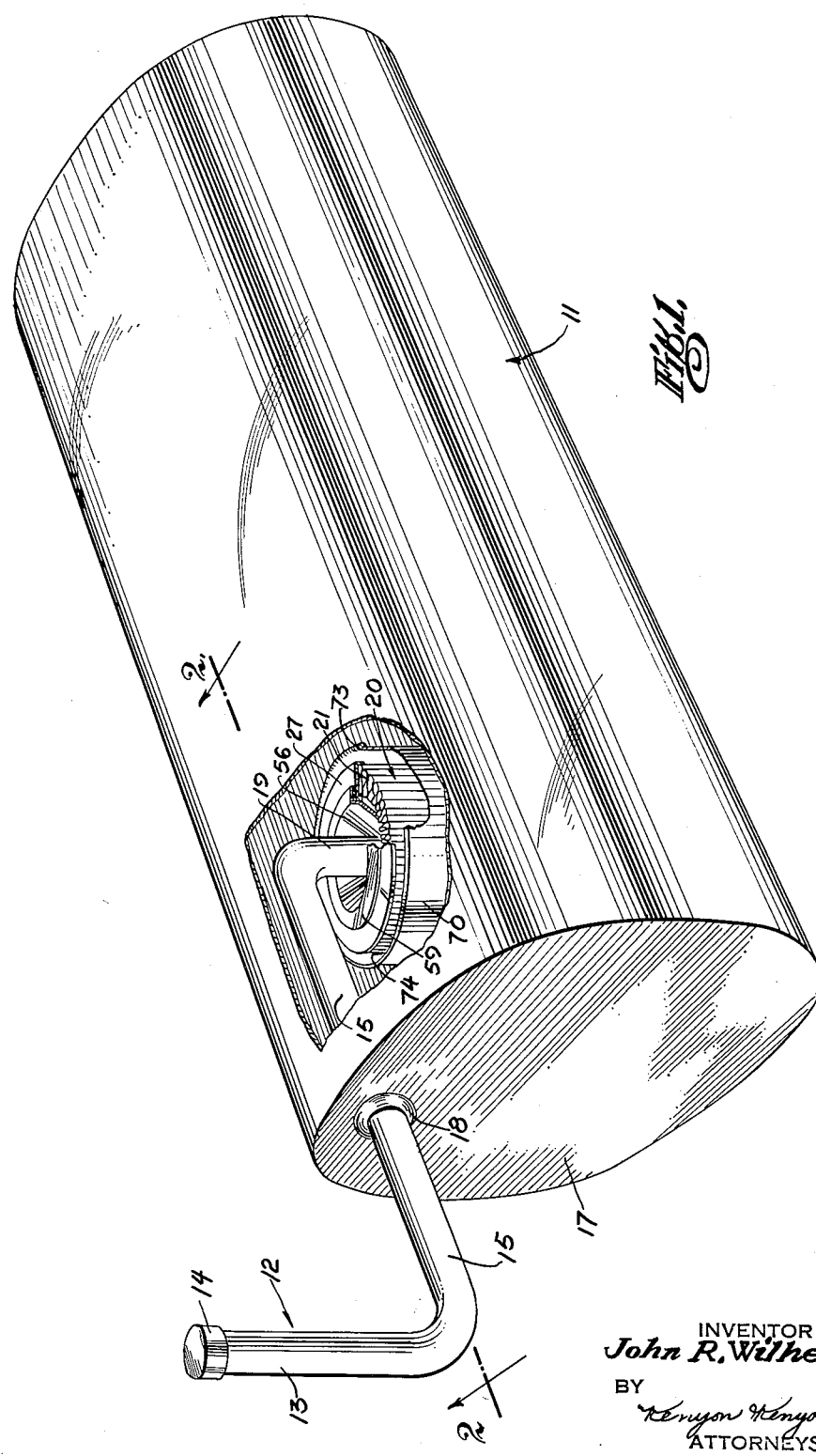
Figure 1 is a perspective view partially broken away of a fuel tank and its filling arrangement in which a filter element has been installed for the purposes of this invention.

Referring now to the drawing, the reference character 11 denotes a conventional fuel tank in which it is intended to store or carry the fuel for an automotive vehicle. The tank 11 is adapted to be supplied or filled with fuel through a filler pipe 12. This filler pipe 12 includes a vertical external portion 13 whose upper end carries a removable cap 14. A horizontal portion 15 joins the lower end of the vertical portion 13. The horizontal portion 15 extends through an end wall 17 of the tank 11 into the interior of the tank. A vapor tight sealing grommet 18 is positioned in the end wall 17 to surround the portion 15 of the pipe that passes through said end wall and acts to prevent any leakage of liquid or vapor from the tank. The grommet 18 also serves to prevent entry of dust or moisture into the tank.

The pipe 12 includes another vertical section 19 which is inside of the tank 11 being connected to the internal end of the horizontal pipe portion 15. This vertical pipe section 19 projects downwardly toward the bottom of the tank 11 and terminates in an open outlet end 19a. The portion 13 of the pipe 12 and its cap 14 at its filling end usually project well beyond the body of the vehicle (not shown) with which the tank 11 is associated, terminating usually at a conveniently accessible point, for example, under a mudguard of the vehicle. The particular locations of the portion 13 of the pipe 12 and its cap 14 vary with different vehicles but in each case an attempt is made to locate them at a readily accessible point for ease of refueling.

The invention contemplates a fuel flow filter installation in conjunction with the filler pipe 12 disposed so that all fuel supplied to the tank 11 for filling purposes via filler pipe 12 will be filtered before it actually enters the storage space of the tank 11. Structural arrangements, therefore, must be provided to mount a filter element 20 appropriately relative to the internal outlet end 19a of the internal filler pipe portion 19 and also to facilitate ready removal of the filter element from the tank 11 for replacement purposes.

A replaceable filter element 20 which is useful for the purposes of this invention may, for example, be of the convoluted or pleated paper type described generally in U. S. Patent No. 2,642,187 issued to A. E. Bell on June 16, 1953. Such filter element as fully described in such patent generally comprises a pleated filter body 21 of filter paper or the like, preferably impregnated with a solution, for example, of phenol formaldehyde resin. Other resin impregnants such as urea formaldehyde or melamine formaldehyde or other thermosetting resins that will provide desirable filtering attributes to the paper similar to those provided by the specific resins named above likewise may be used. The pleated body 21 is tubular in shape and its pleat stretches 22 extend substantially radially relative to the longitudinal axis of the tubular body 21 between inner pleat folds 23 and outer pleat folds 24. The central aperture or inner hole 25 which extends axially and is defined by the inner pleat folds 23 of body 21 has a diameter that is substantially larger than the diameter of the vertical section 19 of the filler pipe 12.

End discs 27 and 28 which preferably are of paper impregnated with one of the resins hereinabove specified are provided for element 20. These end discs 27 and 28 are applied to the opposite end edges of the pleat stretches 22 and are bonded thereto as by a thermosetting resin adhesive as is described in said patent. These end discs 27 and 28 close off the opposite ends of the channels of the pleated body 21. The end discs 27 and 28 during application to body 21 are provided respectively with turned-down inner annular rims 29 and 30 and turned-down outer annular rims 31 and 32 which are firmly bonded to the inner and outer pleat folds 23 and 24 in the manner described in said Bell patent for the purposes of providing rigidity and strength to the pleated body 21. While the particular filter element 20 just described is a preferred type for use in practicing this invention, it is to be understood that other filter elements of a tubular replaceable type may also be used in substitution for filter element 20 described and such use is contemplated.

The filter element 20 is adapted to be installed within the tank 11 in operative and removable relationship with respect to the vertical section 19 of the filler pipe in, for example, the following way:

The tank 11 is provided in its bottom with an access hole 40 whose center is aligned with the axis of the vertical filler pipe section 19. The access hole 40 is bordered by a ring-like reinforcing flange 41. This flange 41 is permanently secured to the tank bottom 42 as by welding or soldering. A plurality of threaded outwardly extending mounting studs 43 are disposed in the flange 41. An access hole cover 44 is removably mountable on the flange 41 to close the access hole 40. It has openings to register with the studs 43. Self-locking nuts 45 that may be screwed onto the studs 43 serve to secure the cover 44 in place in closing relationship over the access hole 40. A hydrocarbon resistant gasket ring 47 interposed between the cover and the flange 41 serves in usual way to prevent leakage of fuel from the tank through the access hole 40 when its cover 44 is in place. An inwardly projecting boss 48 is secured to the cover 44, for example, by welding at 49. The boss 48 is centrally located on the inner face of cover 44 and is provided with a vertically directed hole 50. This hole 50 is axially aligned with the axis of the vertically filling tube section 19 for purposes presently to be described.

Figure 3:
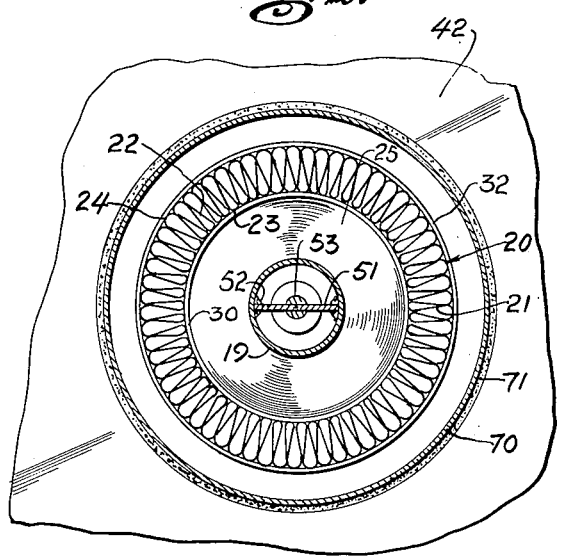
Fig. 3 is a fragmentary transverse sectional view taken along line 3—3 of Fig. 2 and viewed in the direction of the arrows.

The outlet end 19a of the vertical pipe portion 19 of the filler pipe 12 is open. A transversely extending plate 51 is positioned within the pipe portion 19 near its lower end 19a to span it diametrically. This plate is welded, for example, at 52 to the inner surface of said portion 19. As can readily be seen from Fig. 3, the plate 51 is relatively thin and does not materially impede the dimensions of the outlet opening at the mouth or bottom end 19a of the tubular portion 19. The plate 51 serves as a support for a vertically extending rod-like member or stud 53. The stud 53 is permanently secured to the plate 51 as by welding and extends outwardly of the lower end 19a of tubular portion 19 in the axial direction of the latter. Preferably the stud 53 is aligned with the axis of said tubular portion 19. The outermost end 54 of the stud 53 fits into the hole 50 of the boss 48 when the access cover 44 is secured in place. This arrangement provides stability and support for the outer end 54 of stud 53 and other parts carried by said stud as will be hereinafter described. The stud 53 has a threaded portion 55.

The filter element 20 is adapted to be supported concentrically and removably about the vertical pipe portion 19 between a pair of plate-like support elements 56 and 57. In the embodiment shown the support element 56 has generally conical shape and is secured permanently, for example, as by welding at 58 to the outer surface of the tubular pipe portion 19. A peripheral flange 59 on the element 56 serves to engage the upper end disc 27 of the filter element 20 when the latter is mounted for use. The conical part of the support element 56 extends into the center aperture 25 of the filter element 20. A suitable sealing ring or gasket 60 positioned between the flange 59 and the upper end disc 27 of the filter element 20 prevents leakage of fluid fuel in the aperture 25 of the filter element 20 outwardly through the upper end of said aperture.

The conical support element 57 is provided with a lateral flange 61 to engage the lower end disc 28 of the filter element 20. The conical portion of the element 57 is adapted to extend into the aperture 25 of the element 20 from its lower end and a sealing ring or gasket 62 is disposed between the flange 61 and the end disc 28. The conical support element 57 is secured as by welding to a collar 63. This collar 63 fits slidably on the stud 53. A tightening nut 65 operable on the threaded portion 55 of the stud 53 serves to support the collar 63 on the stud 53 and also permits the element 57 to be shifted in longitudinal clamping movement on stud 53 toward the element 56, so that the filter element 20 may be clamped between the two elements 56 and 57 and supported concentrically about the vertical porttion 19 of the filler pipe 12. The conical portions of supports 56 and 57 tend to centralize and urge the filter element 20 in the concentric position just mentioned.

A cylindrical filter housing 70 is mounted internally of the tank 11. The lower end of this housing is welded or soldered at 71 to the tank bottom 42 in the vicinity of the reinforcing flange 41 which borders the access hole 40 of the tank. This provides a leak-proof joint between the tank bottom 42 and the entire lower end of said housing 70 and segregates the internal cylindrical chamber 72 of the housing from the main storage space of the tank. The housing 70 has substantially the diameter of said access hole 40 and is of materially greater diameter than the outer diameter of the filter element 20. The housing axis lies concentric with the axis of the vertical pipe portion 19 of the filler pipe 12. The height of housing 70 is dimensioned so that its upper end 73 which is open lies at a higher level in the tank 11 than that of the upper end disc 27 of the filter element 20 which is carried between the conical support elements 56 and 57. An annular aperture 74 is defined between the upper end 73 of housing 70 and the peripheral rim of the lateral flange 59 of the upper conical support element 56.

Figure 2:
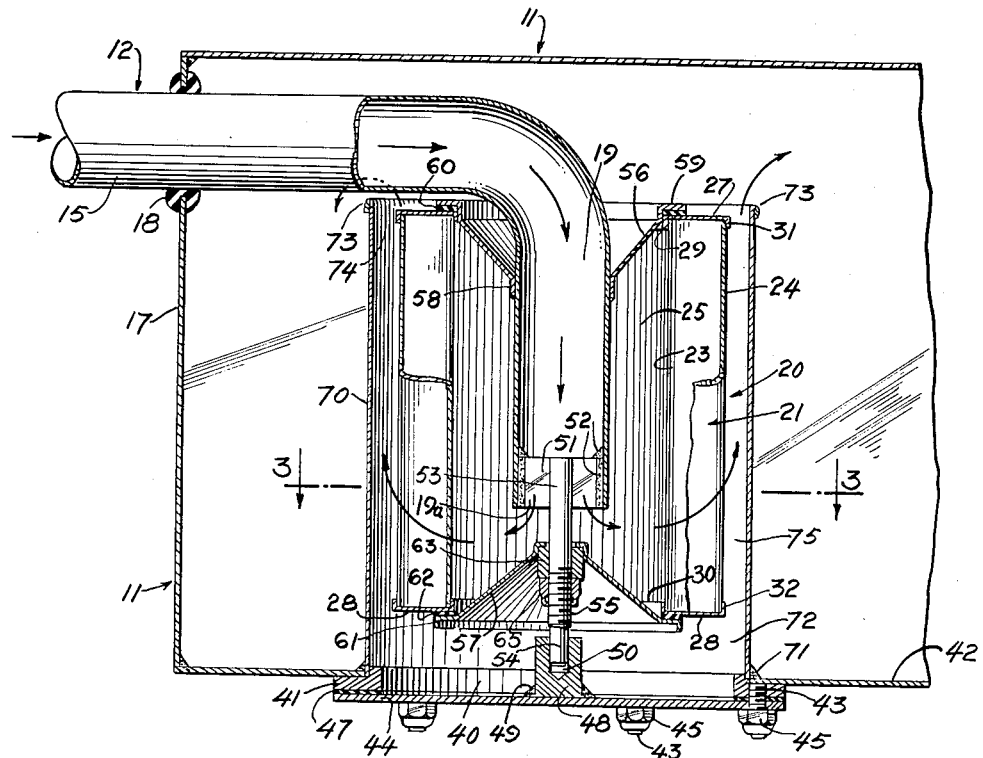
Fig. 2 is a fragmentary longitudinal sectional view of the installation taken along line 2—2 of Fig. 1 and viewed in the direction of the arrows.

Assuming that a filter element 20 has been positioned between the support elements 56 and 57 as shown in Fig. 2 and that the access hole 40 is closed off as shown by the access hole cover 44, operation of the installation is as follows:

The cap 14 of filler pipe 12 is removed and fuel is delivered or poured into the filler pipe in any conventional way from any usual source. The fuel travels successively through the pipe portions 13, 15 and 19, emerges from the open outlet end 19a of pipe portion 19 within the tank and enters the central aperture 25 of the filter element 20. The conical supporting elements 56 and 57 and the sealing gaskets 60 and 62 in conjunction with the respective end discs 27 and 28 of the filter element 20 close off the opposite ends of said aperture 25. The fuel delivered to said aperture 25 can only escape from the latter by passage through the walls of the pleated filter body 21 of filter element 20. During such passage the contaminants in said fuel are trapped by said body 21 and the filtered fluid emerging from the filter body 21 enters the annular space 75 of chamber 72 defined between cylindrical housing 70 and the outer surfaces of said filter element 20. When this filtered fuel completely fills said annular space 75, it overflows at the upper end 73 of said housing through annular aperture 74 and enters the main storage space of the tank 11 for storage and is utilized as required in operating the engine with which the tank is associated.

Inasmuch as the filter element 20 is located directly at the outlet end 19a of the filler pipe within the tank 11 as described, all fuel delivered to the pipe for storage in the tank is compelled by the arrangement to flow through the filter element 20 for filtration before its storage can occur in the main storage space of the tank. All contaminants that would be likely to be introduced during usual filling operations are, therefore, completely eliminated before they have a chance to reach the fuel storage space and do any harm anywhere in the engine fuel system.

The filtering action of element 20 causes a collection of sludge and trapped dirt on its surfaces which ultimately requires its removal and replacement by a fresh filter element 20. This is easily accomplished in the arrangement disclosed by first unscrewing nuts 45 from the studs 43 and removing the access hole cover plate 44 from its covering position over access hole 40. In this removal the fuel that may be present in the space 72 can be caught in a drain pan. The boss 48 will slide off the end 54 of the stud 53 which lies in the boss guide hole 50 when said cover plate 44 is removed and expose the tightening nut 65 through access hole 40. This nut 65 is then unscrewed from the stud 53. The collar 63 and the conical plate 57 carried by the latter may then be slid off stud 53 and the dirty filter element 20 may then be withdrawn through access hole 40. A clean filter element 20 is then inserted in replacement for the removed one via said access hole 40 and the other parts are then reassembled to restore the conditions shown in Fig. 2. Operation is then continued until a further filter element replacement is required.

The invention described thus provides a simple arrangement for filtering out impurities from fuel during filling operations and before actual storage of the fuel in the fuel tank occurs and also provides for quick and simple replacement of dirty filter elements.

It is to be noted that the cylindrical housing 70 acts as a trap within the tank 11 to prevent loss of filtered fluid or fuel from the main storage space of the tank 11 by drainage through access hole 40 when the latter is opened by removal of its cover 44 for filter element replacement purposes. Thus the tank 11 need not be entirely empty while the filter element 20 is being replaced as hereinabove described. Whatever small amount of filtered fluid or fuel may be present in the space 72 may be collected in a drain basin when the cover 44 is removed for filter element replacement and repoured into the filler pipe 12 after the filter element replacement and access cover reassembly have been effected.

While a specific embodiment of the invention has been disclosed, variations in structural detail within the scope of the appended claims are possible and are contemplated. There is no intention, therefore, of limitation to the exact details shown and described.

What is claimed is:

1. A fuel tank filter installation comprising a tank, a filler pipe having a vertically extending portion with an outlet end within said tank, a filter housing surrounding said downwardly extending portion of pipe and its outlet end within said tank, a stud, means for supporting said stud at the outlet end of said portion of pipe, a supporting member carried by said stud, a filter element carried by said supporting member and being completely contained within said filter housing and so positioned with respect to said outlet end that any fuel delivered to said filler pipe for storage in said tank must pass through said element for filtration and overflow the upper end of said housing before its actual storage in said tank can occur, and access providing means including a removable cover plate for an access hole in said tank to permit removal and replacement of said filter element when required.

2. A fuel tank filter installation comprising a tank, a filler pipe having a vertically downwardly extending portion with an outlet end within said tank, a filter housing surrounding said portion of pipe, a stud supported at the outlet end of said pipe, a conical plate mounted on said stud, a filter element supported by said plate and completely contained within said housing, said tank having an access hole in its bottom in alignment with said element to permit removal of said filter element therethrough for replacement when required, and a cover plate mounted on the bottom of said tank to cover said access hole, said conical plate, filter element, and housing being so located within said tank that any fuel delivered to said filler pipe for storage in said tank passes through said element for filtration and must fill at overflow the upper end of said housing before its storage in said tank can occur.

3. A fuel tank filter installation comprising a fuel tank, a filler pipe having an entry end located externally of the tank and a vertical pipe portion with a delivery end located within said tank, a tubular filter housing secured internally of said tank and surrounding said vertical pipe portion, a rod member supported by the vertical pipe portion and extending axially thereof and outwardly of said delivery end, a conical support element secured to said vertical pipe portion, a second conical support element removably mounted on said rod member, a tubular filter element having a central aperture and being carried between said support elements entirely internally of said tubular filter housing and surrounding said vertical pipe portion so that said delivery end opens into said aperture, sealing means between the conical support elements and the tubular filter element to prevent outward flow of fuel entering the aperture of said filter element other than by filtration flow through said element, the fuel after such filtration flow through said element entering said filter housing as filtered fuel, said housing being open at its uppermost end so that the filtered fuel entering and filling said housing may pass from the housing for storage in the tank, said tank having an access hole in its bottom aligned with said filter element to permit withdrawal of said element therethrough for replacement, a cover plate for said access hole and means for removably mounting said cover plate from said bottom in sealed closing relationship about said access hole.

4. In a fuel tank having a filler pipe, a filter installation within said tank in relationship to said filler pipe to provide for the filtration of fuel delivered to said filler pipe for storage in said tank before the fuel that has entered the pipe may reach the main storage space of said tank, said tank having an access hole in its bottom, a cover plate removably attached externally of the said bottom and covering said access hole, a filter housing secured internally of the tank bottom in alignment with said access hole, said filler pipe having a terminal portion located internally of said tank that is concentric with said housing and which has an open outlet end that lies within said housing, a stud member secured to said terminal portion and projecting outwardly of said open end, a conical support plate removably mounted on said stud member concentrically relative to said terminal portion of said pipe, a second conical support plate secured to said terminal portion of said pipe in spaced and aligned relationship relative to said first-named conical support plate, and a substantially cylindrical filter element having a central aperture, said element having its opposite ends engaged respectively by the first and second-named conical support plates which extend into said aperture from the opposite ends of said element and close off said aperture at said ends, said conical support plates serving to locate and support said filter element concentrically within said filter housing with an annular space between the housing and outer cylindrical surface of the filter element, and said annular space being segregated from the main storage space of said tank by said housing and being in communication therewith through an opening at the upper end of said housing, whereby in the flow of fuel from the filler pipe into the tank for storage its passage is directed first outwardly of the open end of said filler pipe terminal portion and into said aperture, then through the filter element for filtration and into said annular space and thereafter as filtered fluid from said annular space via the opening at the upper end of said housing into said main storage space.

5. In a fuel tank, a filter installation including an access hole in the bottom of said tank, a cover plate attached to the outer surface of the bottom of said tank and covering said access hole, a filter housing attached to the inner surface of the bottom of said tank in alignment with said access hole, a filler pipe entering said tank and having a downwardly extending portion terminating in an open end within and concentric with said housing, a stud fastened to the terminating open end of said pipe, a conical plate mounted on said stud and concentric with said terminating open end of said pipe, a filter element supported at one of its ends by said plate and located entirely and concentrically within said housing to form an annular space between said element and said housing, said element being of cylindrical form with a central aperture, and another conical plate mounted on the filler pipe for engagement with the other end of the filter element, both of said conical plates closing off the central aperture at the ends of the element, said installation effecting flow of fuel from the filler pipe into the central aperture, then through the element for filtration and as filtered fuel into the annular space between said element and housing, and then on overflowing from said space as filtered fuel into said fuel tank for storage, and said cover plate being removable to permit removal and replacement through said access hole of said filter element when required and said housing preventing drainage of stored fuel in said tank via said access hole.

6. In combination, a fuel tank having an access opening in its bottom, a removable cover plate for said opening, a filler pipe extending through a wall of said tank and having an internal pipe portion with an open outlet end within said tank overlying said access opening, a filter housing within said tank secured to the bottom thereof adjacent the access opening and surrounding said internal pipe portion and its outlet end, a tubular filter element having a central aperture, a pair of support members, a first one of which is fixedly secured to the internal pipe portion and the other one of which is movable toward and away from said first one for clamping said filter element between the two support members in a position entirely within said filter housing wherein the open outlet end of said internal pipe portion lies within said central aperture and an annular space is provided between the housing and said filter element, said annular space being in communication at an upper portion of said housing with fuel storage space of said tank, and sealing means in conjunction with said support members for closing off the central aperture of said filter element at its opposite ends, whereby fluid fuel delivered to said filler pipe for storage in said storage space must pass from the said pipe outlet end into said aperture, then through said filter element for filtration and into said annular space and thereafter as filtered fuel from said annular space into said storage space.

References Cited in the file of this patent

UNITED STATES PATENTS

| 1,191,741 | Scull | July 18, 1916 |
| 1,501,804 | Page | July 15, 1924 |
| 1,677,118 | Ford | July 10, 1928 |
| 2,226,045 | Baldwin | Dec. 24, 1940 |
| 2,325,399 | Houston | July 27, 1943 |
| 2,606,628 | Hasselwander | Aug. 12, 1952 |
| 2,642,187 | Bell | June 16, 1953 |

FOREIGN PATENTS

| 2,931 | Great Britain | Feb. 3, 1897 |